United S

Seaborn, Jr.

[11] 3,914,692

[45] Oct. 21, 1975

[54] EMERGENCY COMMUNICATION SYSTEM

[76] Inventor: George C. Seaborn, Jr., 926 Warfield, Richardson, Tex. 75080

[22] Filed: Aug. 29, 1973

[21] Appl. No.: 392,498

[52] U.S. Cl. ...................... 325/53; 325/55; 325/64; 325/16; 325/111; 325/117; 340/224

[51] Int. Cl.$^2$. H04B 1/00; H01B 1/38; H04B 1/034; G08B 1/08

[58] Field of Search ........... 325/16, 53, 55, 64, 111, 325/113, 117, 361; 340/312, 313, 314, 224

[56] References Cited

UNITED STATES PATENTS

| | | | |
|---|---|---|---|
| 3,017,631 | 1/1962 | Fink et al. | 325/361 X |
| 3,290,597 | 12/1966 | Denney et al. | 325/64 |
| 3,376,509 | 4/1968 | Willcox et al. | 325/53 X |
| 3,588,858 | 6/1971 | Demuth | 325/64 X |
| 3,668,526 | 6/1972 | Raskin | 325/64 |
| 3,678,391 | 7/1972 | Gough | 325/55 |
| 3,723,876 | 3/1973 | Seaborn, Jr. | 325/64 |
| 3,745,462 | 7/1973 | Trimble | 325/55 X |
| 3,766,523 | 10/1973 | Brocker et al. | 325/64 X |

*Primary Examiner*—Robert L. Griffin
*Assistant Examiner*—Aristotelis M. Psitos
*Attorney, Agent, or Firm*—Richards, Harris & Medlock

[57] ABSTRACT

The specification discloses an emergency communication system which includes a portable unit for being carried by a wearer. The portable unit includes a radio transmitter and receiver and is operable to selectively transmit and receive coded radio signals. A console is operable to receive the coded radio signals transmitted from the portable unit and in response thereto for transmitting an emergency signal via a leased telephone line to a remote central station. The central station receives the emergency signals and implements a call for assistance and generates an acknowledge signal. The console receives the acknowledge signal and transmits a coded acknowledge signal to the portable unit. The portable unit receives the coded acknowledge signal and operates a vibrator to notify the wearer that assistance is being provided. Switches are provided on the console which may be actuated by the wearer during a predetermined time period after generation of the acknowledge signal, in order to cancel the summoning of assistance by the central station.

2 Claims, 3 Drawing Figures

EMERGENCY COMMUNICATION SYSTEM

FIELD OF THE INVENTION

This invention relates to emergency communication systems, and more particularly relates to emergency communication systems including a portable unit for being carried by a wearer for requesting assistance.

THE PRIOR ART

A wide variety of various types of emergency warning devices have been previously developed for transmitting indications of a fire, burglary or other emergency situations. Certain of these devices have utilized a portable unit for being carried by a wearer and for being operated to transmit a signal to a remote station in order to summon assistance. An example of such a prior system in U.S. Pat. No. 3,723,876 issued Mar. 27, 1973 to the applicant and entitled "EMERGENCY DISTRESS SIGNAL". However, in such previously developed systems, the wearer has not heretofore been able to determine whether or not assistance is being provided. Thus, the wearer in some instances might lose valuable time in attempting to notify the central station of an emergency in case of an inoperable portable unit. Moreover, with such prior systems the wearer is subject to a degree of uncertainty and mental anguish due to the fact that he does not know for certain that his alarm signal has been received and is being processed. In addition, many such previously developed devices have not included sufficient failsafe features to eliminate false or unintentional activation of an alarm.

SUMMARY OF THE INVENTION

In accordance with the present invention, an emergency communication system is provided which substantially eliminates and reduces many of the problems herein noted with respect to previously developed systems.

In accordance with the present invention, an emergency communication system includes a portable unit for being carried by a wearer. An alarm in the unit is provided to be actuated to transmit alarm radio waves to a remote location. A console at the remote location receives the alarm radio wave and transmits an acknowledge radio wave indicating the assistance has been summoned. Circuitry in the unit receives the acknowledge radio waves and notifies the wearer that assistance has been summoned.

In accordance with another aspect of the invention, a portable emergency warning unit is provided to be carried by a wearer and includes a housing of suitable dimensions for being carried on the person of the wearer. An alarm switch is provided to be actuated by the wearer. A radio transmitter is actuated by the switch to transmit coded ratio signals indicating an alarm situation. A radio receiver receives the coded radio signals indicative that assistance is to be summoned. A vibrator is operable in response to the radio receiver to indicate to the wearer that assistance is forthcoming.

In accordance with another aspect of the invention, an emergency communication system includes a portable unit for being carried by a wearer. A radio transmitter and receiver is disposed within the unit and is operable to selectively transmit and receive coded radio signals. A console receives the coded radio signals transmitted from the unit and in response thereto transmits emergency signals to a remote central station. Circuitry at the central station receives the emergency signals and implements the provision of assistance to the wearer of the portable unit and also generates an acknowledge signal. Circuitry at the console receives the acknowledge signal and transmits a coded acknowledge signal. The portable unit is responsive to the reception of the coded acknowledge signal for notifying the wearer that assistance is being provided.

In accordance with yet another aspect of the invention, an emergency communication system includes a portable unit for being carried by a wearer and includes a radio for transmitting and receiving coded radio signals. A console is remotely located from the portable unit and has means for receiving the coded radio signals and for transmitting digital signals requesting assistance over a telephone line. A central console is connected to the telephone line for receiving the digital signals and for generating an acknowledge signal. Circuitry at the console receives the acknowledge signal and transmits coded radio signals to the portable unit. The radio at the portable unit receives the coded radio signals and operates a vibration system in the portable unit to notify the wearer of the acknowledge signal. The central control has delay circuitry for delaying a predetermined period of time after generating the acknowledge signal prior to calling assistance. A switch on the console is operable to be actuated within the predetermined period of time for preventing the central control from calling for assistance.

DESCRIPTION OF THE DRAWINGS

For a more complete understanding of the present invention, and for further objects and advantages thereof, reference is now made to the following descriptions taken in conjunction with accompanying drawings, in which.

DESCRIPTION OF THE PREFERRED EMBODIMENT

Figure 1:
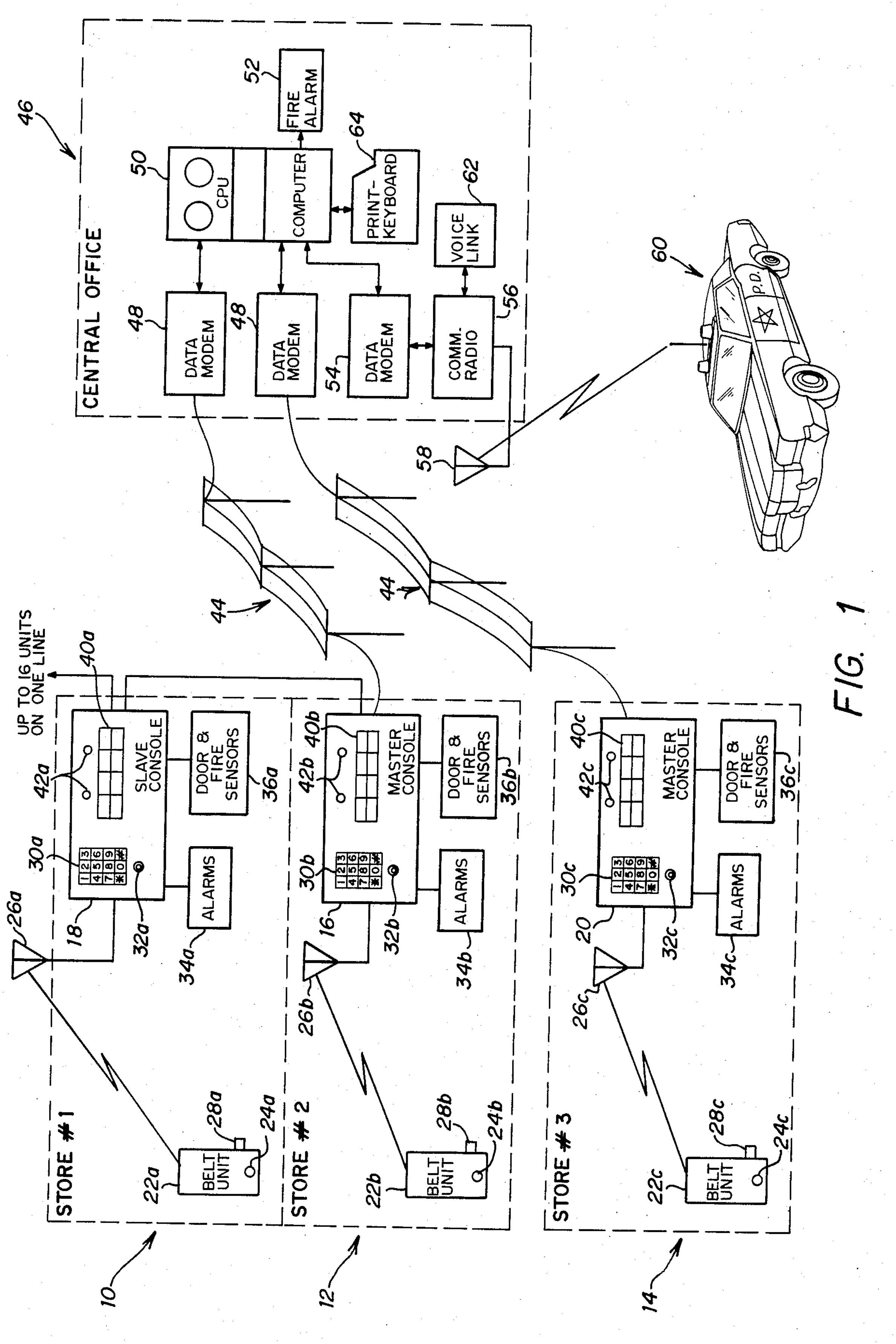
FIG. 1 illustrates a block diagram of the present system.

Referring to FIG. 1, a block diagram of a typical system utilizing the present invention is illustrated. Three remote sensor systems 10, 12 and 14 are located in three separate stores, business establishments, homes or the like. Store No. 2 utilizes a master console 16 which is interconnected to a slave console 18 located in store No. 1. Up to fifteen slave consoles may be connected in series to the master console 16, so that adjacent stores or business establishments may be interconnected into a single telephone line. Store No. 3 utilizes only a single master console 20. It will, of course, be understood that the system shown in FIG. 1 is exemplary, and that a complete system will include a plurality of such consoles interconnected in various manners.

Each of the sensor stations includes one or more portable belt units **22*a–c* which may be carried on the person of one or more key persons within the store. Each of the belt units 22*a–c* includes a manually operable push button switch 24*a–c*** which may be operated by the wearer to cause a predetermined radio signal to be transmitted to one of the antennas 26*a–c* of the consoles 16, 18 or 20. Each of the belt units 22*a–c* also includes a vibrating device 28*a–c* which may be operated in response to receipt of a predetermined radio signal transmitted from one of the antennas 26*a–c*. As will be described in greater detail, initial operation of the vibrators 28*a–c* serve to indicate to the wearer that his request for assistance has been received. Unless the wearer then cancels his call for help within a predetermined time, the vibrator is again actuated to indicate to the wearer that assistance has been summoned. In this manner, the wearer is apprised that his unit is functioning properly. If the vibrator is not operated properly, the wearer may take steps to again operate the belt unit to request assistance, or to actuate another alarm system.

Although manually operable button switches 24*a–c* have been illustrated, additional switches may be incorporated into the belt unit 22*a–c*. For example, a "knock-down" switch may be utilized which is actuated when the belt unit is oriented in a horizontal position. Thus, when the wearer falls because of an accident or due to an assault, the knock-down switch will be operated to transmit an alarm. Such a knock-down switch may comprise a mercury switch which is actuated when a quantity of liquid mercury flows into contact with a switch contact.

Each of the consoles 16, 18 and 20 includes an array of manually operable push buttons 30*a–c*. For example, the arrays 30*a–c* may comprise a conventional 12 button touchtone pad utilized on push button telephones. Operation of a particular button causes the generation of a unique coded tone sequence in the well known manner. The arrays 30*a–c* may be operated to prevent the generation of a false alarm or may be utilized by the operator to transmit information to the remote station as desired. For example, the arrays 30*a–c* may be utilized to sent coded routine instructions to the remote station to indicate locking up of the store, opening of a store, change of normal hours, emergency taken care of, and the like.

Key switches 32*a–c* are provided on the consoles to prevent operation by unauthorized persons. Alarms 34*a–c* are connected to the console for operation upon detection of an alarm situation by the belt units 24*a–c* or by sensors 36*a–c*. The alarms 34*a–c* may comprise audible alarms, flashing lights or the like. Additional sensors, such as door and fire sensors 36*a–c*, are connected to the consoles to allow the automatic detection of emergency situations. Electrical indications of emergency situations are transmitted from the sensors 36*a–c* to the respective console, which then transmits coded signsls through the telephone lines to the remote central station in the manner to be subsequently described.

Each of the consoles also includes annunciator panels 40*a–c* which may be utilized to display standard functions such as message received, help is on the way, system test okay, A. C. power on, battery stand-by power on, or the like, plus any special functions required by a particular subscriber. In addition to the arrays 30*a–c*, each console includes several dedicated buttons 42*a–c* which may be operated to transmit signals indicating a robbery, a suspicious person, fire, medical emergency or the like.

As will be later described in greater detail, each of the consoles 16, 18 and 20 include digital logic circuitry necessary to encode and serially transmit status messages and push button entries over leased telephone lines 44 to a remotely located central office designated generally by the number 46. In addition, each of the consoles 16, 18 and 20 contain a radio receiver in order to pick up signals from the belt unit 22*a–c*. The consoles also include data modems for communicating through the telephone lines 44 to the remotely located central office, as well as multiplexing circuits to combine and sort by address the messages between the central station and the consoles connected to the master console.

As shown in FIG. 1, each master console 16 may have up to 15 slave consoles 18 connected thereto in series. A slave console generates serial digital data which is converted to tone coded data by the master console and transmitted over the leased telephone line 44. In this way, only one telephone interface is required for up to sixteen individual console stations.

The central office 46 includes data modems 48 which receive and transmit data from the leased telephone line 44 and apply data to or receive data from the central computer 50. Computer 50 may comprise any one of a number of commercially available small process and control computers commonly termed minicomputers. Specifically, computer 50 may typically handle 64 in/out data modems. The memory of the computer is used to store all of the data required for operation of the system, such as the store owners name, the address, phone numbers, normal store hours, emergency procedures and the like required by the system. The computer may operate a fire alarm 52 in order to immediately summon help in the case of a fire. In addition, the computer may generate data through a data modem 54 to a communication radio 56. In this manner, radio 56 may transmit and receive data through an antenna 58 to police vehicle 60 or to a police central station in order to summon assistance. Voice communication with the police car assisting may be also provided by a voice link 62 connected to the radio 56. The attendant at the computer is notified of all emergencies by use of a printer 64. Billing may also be performed automatically by the computer with the use of a printer 64.

In operation of the system, the computer 50 continually interrogates each master console in the system for the status of itself and any slave consoles. Routine status reports indicating "all is well" will be thus reported about once per second which is the time required for 16 consoles to report. The computer 50 may interrupt the reporting at any time to send commands to an individual console to light the annunciator displays or to sound an alarm. When an abnormal report is provided by a console, the computer 50 prints out the nature of the alarm and the appropriate persons to be contacted or action to be taken on the printer 64. If appropriate, the computer 50 automatically contacts the police patrol car 60 by the radio data link.

In operation of the system, one of the push button switches 24*a–c* may be actuated by the wearer of any of the belt units 22*a–c*. The operation of the switch creates a tone modulated radio signal which is transmitted to one of the antennas 26*a–c* in the immediate area. Each of the belt units 22*a–c* has a unique modulation code to provide identification of a particular belt unit. The console which receives the emergency signal from the belt unit transmits coded digital signals through the leased telephone lines 44 and through the data modem 48 to the computer 50. The computer 50 prints out the required action to be taken on the printed keyboard 64 or alternatively directly contacts the patrol car 60.

After the patrol car 60 is contacted, the patrolman in the car responds with an "in route" reply to the computer 50, which then notifies the emergency message originator by transmitting coded tone signals through the leased line 44 to the console. The console then transmits a radio signal to the belt unit to operate the respective vibrator 28*a–c*. When the patrolman arrives at the store, he notifies the computer with an "at the scene" message via his car radio. The patrolman must then transmit a clearing message through one of the key arrays 30*a–c* or through his own radio within a predetermined time, or the computer will dispatch a back-up unit.

In order to prevent the transmission of false alarms, after one of the switches 24*a–c* has been operated, one of the arrays 30*a–c* must be operated with a predetermined short period of time in order to cancel the request for assistance. The wearer is notified that the period of time is running by a short period of operation of the vibrator 28. If the operator does not cancel the request for help within the predetermined time by operation of the correct buttons on the array 30*a–c*, the computer 50 automatically sends a request for assistance and also generates through the console two bursts of operation for the vibrator 28 to indicate to the wearer that help is on the way. Thus, the vibrator systems of the belt units 24*a–c* ensure against the possibility of a generation of a false alarm, while indicating to the wearer that the system is working properly.

Figure 2:
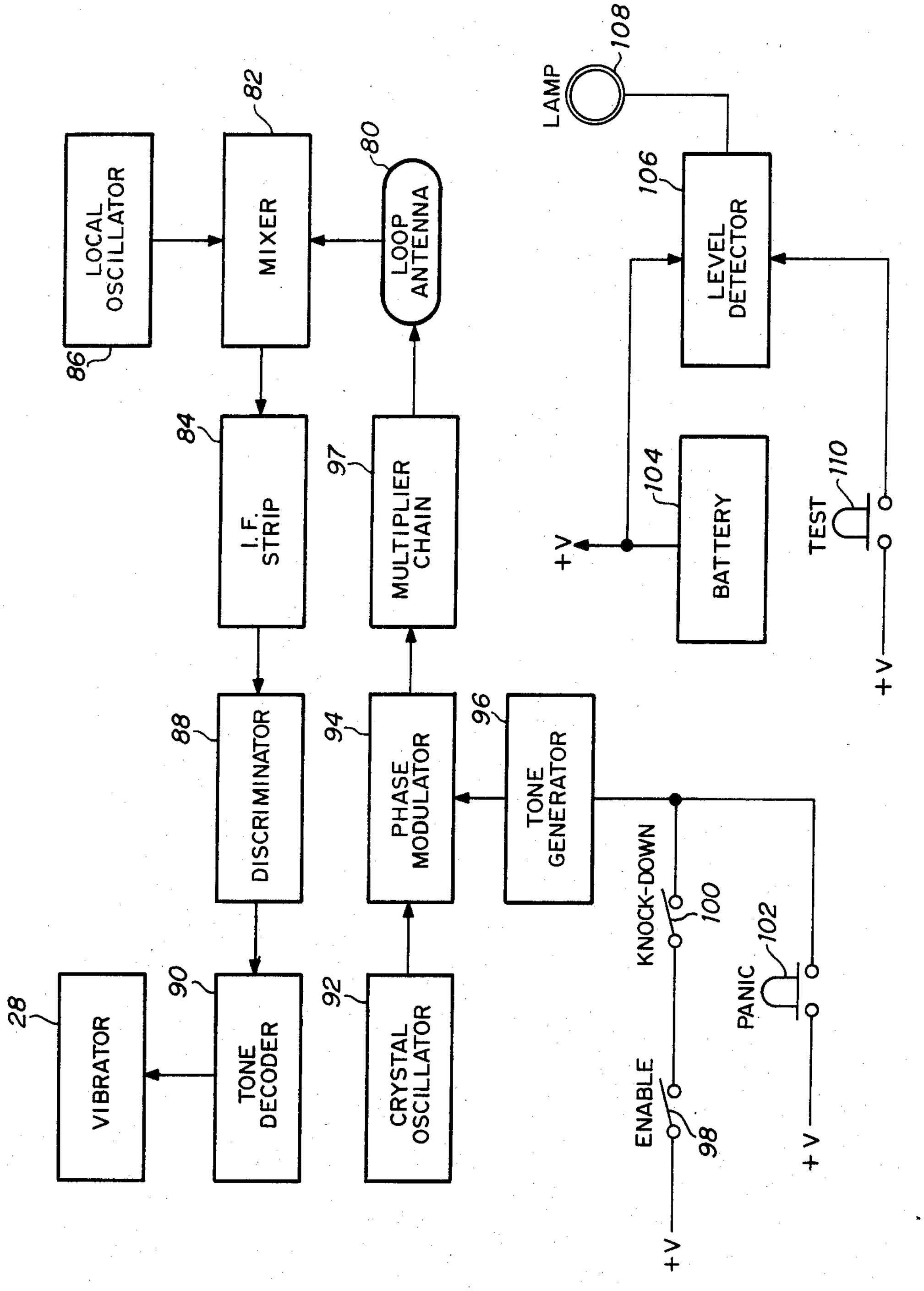
FIG. 2 is a block diagram of the portable unit of the invention.

Referring to FIG. 2, the circuitry of the belt unit 22 is illustrated in detail. A loop antenna 80 is located within a housing, not shown, which may be clipped to the wearer's belt or likewise attached to the wearer's clothing. The output of the antenna is connected to a radio receiver section including a mixer 82 which is connected to an I.F. strip 84. The output of a local oscillator 86 is connected to the mixer 82. The output of the strip 84 is applied through a discriminator 88 to a tone decoder 90 which operates the vibrator 28 upon reception of a predetermined tone. Decoder 90 comprises, for example, a narrow filter. The transmission portion of the belt unit includes a crystal oscillator 92 which generates a predetermined frequency signal which is applied to a phase modulator 94. The output of the phase modulator 94 is connected through a multiplier chain 97 to the loop antenna 80. A tone generator 96 is operated by an enable switch 98 and the knock-down switch 100, or by the operation of the panic button 102.

A battery test system incorporated into the belt unit includes a small battery 104 which normally applies voltage for operation of the circuitry shown in FIG. 2. The output of the battery 104 is connected to the lever detector 106, the output of which is applied to a lamp 108. A test button 110 is provided to energize detector 106, such that the lamp 108 is illuminated if the output of the battery 104 is at a suitable level.

In operation of the belt unit, if the knock-down switch is to be utilized, the enable switch 98 is closed and when the knock-down switch is actuated, the tone generator 96 is energized in order to apply a second tone to the phase modulator 94. Phase modulator 94 thus modulates the output of the crystal oscillator 92 with the audio tone generated by the generator 96. Each of the belt units 22 will include a different tone frequency which is generated by the generator 96. The tone modulated signal is applied through the multiplier chain 97 to the loop antenna 80 and is thus transmitted to the sensor.

When the sensor transmits an acknowledge radio signal back to the belt unit, the signal is received by the loop antenna 80 and is applied through the mixer 82, I.F. strip 84 and discriminator 88 which comprises a conventional superheterodyne VHF receiver. On reception of the proper coded tones, the tone decoder 90 generates an enable signal to the vibrator 28 and the vibrator 28 to alert the wearer of reception of his signal. The console transmits a different coded tone for each belt unit so that only the particular belt unit desired to be acknowledged has its vibrator operated.

The frequency of operation of the code tones, is for example, in the 1,000 CPS audio range. The frequency of the radio carrier is preferably in the VHF band, such, as, for example, 150–170 megacycles.

Figure 3:
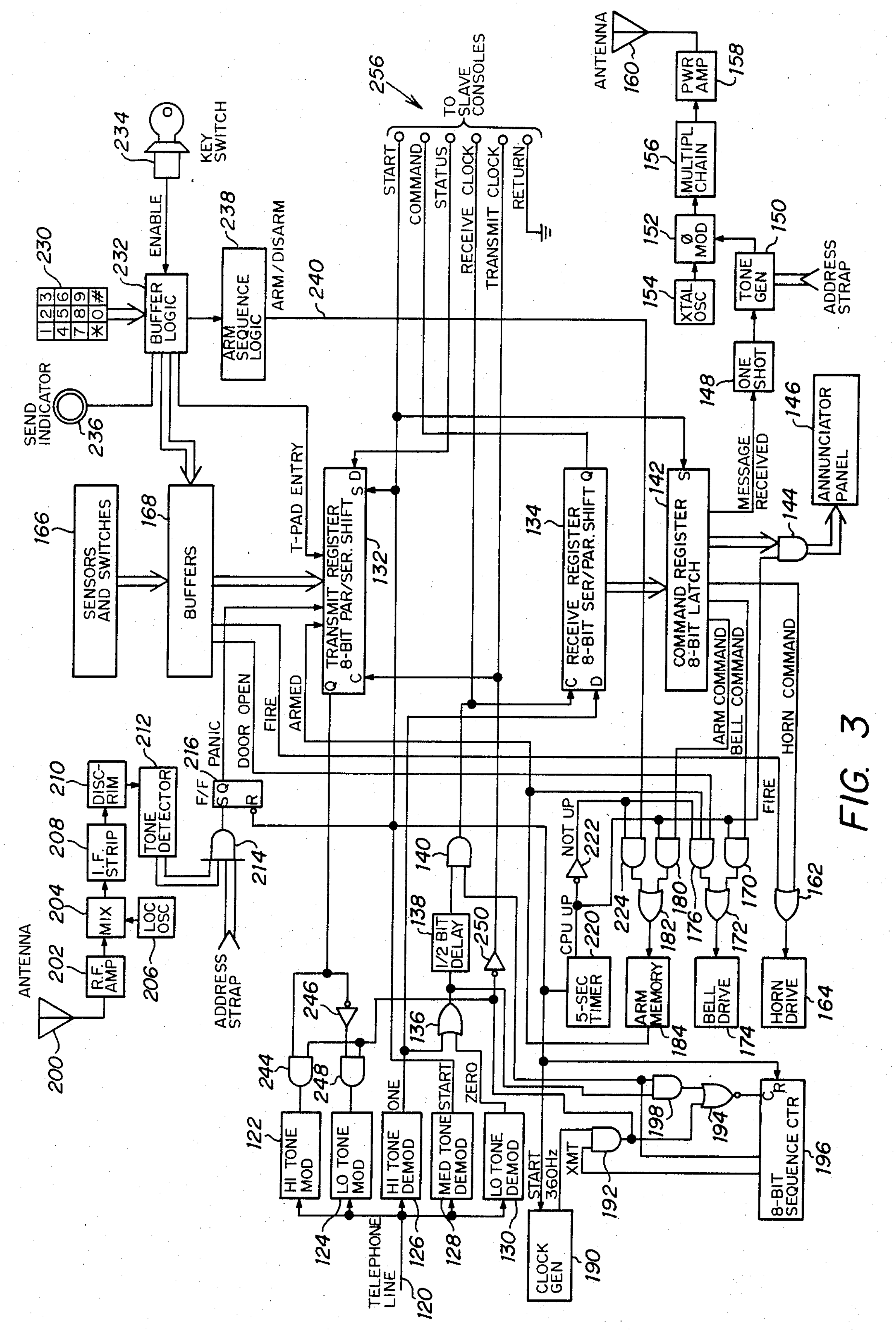
FIG. 3 illustrates a schematic diagram of the master console of the invention.

Referring to FIG. 3, the schematic illustration of the construction of a master console is shown. Construction of the slave consoles is identical to the master console, with the omission of the required modem circuitry. The console is connected to a leased telephone line 120 by a high tone modulator 122 and a low modulator 124. In addition, the system is connected via a high tone demodulator 126, a medium tone demodulator 128 and a low tone demodulator 130.

Reception of a medium tone signal by the demodulator 128 operates as a start signal which is applied to a transmit 8 bit shift register 132 and also to the serially connected slave console. Reception of a tone by the high tone demodulator 126 operates as a logic 1 signal which is applied to an 8 bit serial shift register 134. Reception of a low tone by the demodulator 130 operates as a zero level which is applied as an input to an OR gate 136, along with the 1 signal from the demodulator 126. The output of gate 136 is applied to a ½ bit delay circuit 138. The output of the delay circuit 138 is applied to an AND circuit 140, the output of which is directed to the shift register 134. The output of the shift register 134 may be loaded onto a command register 142, the output of which may be directed through an AND gate 144 to the annunciator panel 146.

A preselected bit stored in the register 142 is applied through a one shot multivibrator 148 to indicate a message received. The one shot 148 operates a tone generator 150 which operates according to an address strap to control a phase modulator 152. Modulator 152 modulates the output of a crystal oscillator 154 to apply the tone signal through a multiplier chain 156 and a power amplifier 158 to transmit the tone signal via the antenna 160. The radio signals transmitted from the antenna 160 operate the vibrator located on the belt unit in the manne previously described. Data bits stored in the register 142 indicate the arm command, the bell command and the horn command, as labeled.

The horn command is applied as an input to an OR gate 162 for operation of a horn drive circuit 164. The sensors and switches 166 of the invention are applied through buffers 168 to the shift register 132. In addition, one bit of the data stored in the buffers 168 indicates a fire alarm which is applied as a second input to the OR gate 162 in order to operate the horn drive 164. The bell command generated from the register 142 is applied through an AND gate 170 and through an OR gate 172 to operate a bell drive 174. A bit from the buffers 168 indicates a door opened and is applied to an input of an AND gate 176 to also operate the bell drive 174. The arm command signal generated from the register 142 is applied through an AND gate 180 and through an OR gate 182 to the arm memory 184.

A clock generator 190 generates a 360 Hz clock signal which is applied through an AND gate 192 and through a NOR gate 194 to an 8 bit sequence counter 196. The clock generator thus clocks the counter 196. The output of the OR gate 136 is applied as an input of an AND gate 198. The counter is reset and the clock generator synchronized by the START pulse from the medium tone demodulator.

Radio signals transmitted from one of the belt units are detected by an antenna 200 and are applied through an RF amplifier 202 and a mixer 204 which mixes received radio signals with a local oscillator 206. The mixed signals are applied through an I.F. strip 208 and through a discriminator 210. The output of discriminator 210 is applied through a tone detector 212 which generates an input to a coincidence gate 214. Gate 214 also receives addresses from an address strap. The output of gate 214 operates a flipflop 216 which generates a panic signal which is applied to the 8 bit shift resister 132. This flipflop is reset at the beginning of each message by the START pulse. The START the shift register 132. The start, command, status, receive, clock and transmit clock signals are applied via terminals 256 to the slave consoles which are connected in series with the master console.

In operation of the system, whenever the computer located at a remote central station desires a readout from the master console, a medium tone burst is transmitted via the telephone line 120. The tone burst is detected by the medium tone demodulator 128 and becomes a start pulse. The start pulse initializes the console and all status or touchtone data is loaded simultaneously into transmitter shift register 132. When a plurality of slave consoles are used, all data is loaded into a plurality of shift registers connected in series to form a long series of 8 bit shift registers. Immediately following the loading of the register 132, the master console clock generator 190 begins clocking all of the registers. Status data from the master console is first transmitted serially through the gates 244 and 248 to the high and low tone modulators 122 and 124, which generate serial tones through the telephone line 120 to the central station. Status data from the slave consoles is then later transmitted after all of the data from register 132 is transmitted. Data from the last slave console passes through all the other slaves and then through the master console to form the last word in the data frame.

The data frame is formatted as follows:

START ↓ DATA FRAME (each word is one console/store)

| | | | | | | |
|---|---|---|---|---|---|---|
| word 0 | word 1 | word 2 // | 12 | word 13 | word 14 | word 15 |

pulse also resets the 5 second timer 220. The output of the timer 220, while being reset at intervals less than 5 seconds, generates a CPU Up signal which is applied through an invertor 22 as an input to an AND gate 224 and as an input to gate 176. The CPU Up signal is applied as an input of gate 180 and 170 as an input to gate 144.

The touchtone pad 230 comprises 12 buttons which generate coded tone sequences to a buffer logic 232. Operation of a key switch 234 enables the buffer logic. The buffer logic 232 operates a send indicator lamp A start signal transmitted from the central station triggers data frame response from the master console in the manner previously described. At the end of the frame, the master console control logic shifts from transmit to receive mode and stops. Normally, the central station continues interrogating the consoles by sending another start command. However, if the central station has a command for one of the consoles of the system, the central station will follow the master console's data frame with a data frame of its own. This data frame is reversed in the following manner:

COMMAND FRAME

| | | | | | | |
|---|---|---|---|---|---|---|
| word 15 | word 14 | word 13 // | word 3 | word 2 | word 1 | word 0 |

236 and applies the data transmitted from the touchtone pad 230 into the buffers 168 for storage in the shift register 132. An indication from the buffer logic 232 operates an arm sequence logic 238 which generates an arm/disarm signal via lead 240 into gate 224.

The Q output of the shift register 132 is applied as an input to an AND gate 244, the output of which is applied to the high tone modulator 122. The Q output of register 132 is also applied through invertor 246 as an input to an AND gate 248, the output of which is applied to the low tone modulator 124. The output of gate 192 is applied as an input to gates 244 and 248 and also is applied through an invertor 250 to the clock input of If a touchtone entry is made on the pad 230 at any console, then the touchtone pad bit will be applied through the buffer logic 232 and the buffers 168 to the register 132 and will be set in the word for that console. The remainder of the word will be the touchtone pad data. As an example, the following illustrates the possible normal and touchtone pads status words and the command words generated from the central station:

| STATUS WORD Normal | T-Pad | COMMAND WORD |
|---|---|---|
| 1. T-pad (0) | T-pad (1) | 1. Arm/Disarm |
| 2. Armed | Column 1 | 2. Bell |
| 3. Door Open | Column 2 | 3. Horn |

–Continued

| STATUS WORD Normal | T-Pad | COMMAND WORD |
|---|---|---|
| 4. Fire | Column 3 | 4. Message Received |
| 5. Panic | Row 1 | 5. Help Enroute |
| 6. Robbery | Row 2 | 6. System Test OK |
| 7. Medical Emg. | Row 3 | 7. Spare |
| 8. AC Power OK | Row 4 | 8. Spare |

The free running clock generator 190 generates a 360 Hz signal for transmission of data. Clock generator 190 applies a clock signal to the sequence counter 196 to run the counter to a count of 128. This count is long enough to transmit one data frame. The counter then hangs up and goes into the receive mode. The next start pulse again zeros the clock generator and the sequence counter and the operation again continues. One hundred twenty seven counts from the counter 196 are applied to the shift register 132 to shift the data to the modulators 122 and 124 for transmission to the central station.

As previously indicated, status data to be transmitted to the central station originates in the sensors and switches 166, which are fire detectors, switches and the like. Additional information is provided from the panic buttons operated on the belt units or on the touch pad 230. All of these inputs pass through the buffers 168 where they are converted to binary logic signals. Eight bits of data from the buffers 168 are continuously being presented as a parallel word to the transmit register 132. When the start pulse is received from the central station, the start pulse strobes the transmit register 132, causing it to parallel load the status bits. As a start pulse also resets the sequence counter 196, transmit clocks start immediately and continue until all 128 status bits have been transmitted.

The first half of the transmit clock cycle enables the output from the end of the transmit register 132 to key either the high or low tone modulators 122 or 124, depending upon whether it is desired to transmit a 1 or a 0. The second half of the transmit clock cycle advances the sequence counter 196 and shifts all data in the transmit register 132 one place towards the end, bringing the next bit to the end of the register. The transmit registers in all of the slave consoles are placed end to end to form one long shift register, so that as the registers clock through the data frame, the data shifts through all of the consoles to the end of the register in the master console.

The tone modulated radio signals from the belt units are detected by the antenna 200, wherein the signals are decoded and converted into a binary address identifying the unit making the transmission. If the address thus decoded matches the console address strapped in, the coincidence gate 214 will be activated and the panic memory reset at the flipflop 216. When the next status data frame is transmitted, the panic bit will be transmitted from the register 132 and the memory cleared.

If the touchtone buffer logic 232 is enabled for operation by the key switch 234, the digit entered is stored in the buffer logic 232 and the pad 230 is locked to prevent further entry. The send indicator 236 is turned off to indicate that the digit has been stored and the touch tone pad entry bit 1 is set. Touchtone pad entries data overrides the normal status of the system, so that when the next status frame is transmitted, the touchtone pad entry data is sent into the normal status data. At the end of the frame being transmitted, the buffer logic 232 is reset, turning on the send indicator 236 and allowing entry on another digit.

At the end of each status data frame, the master console terminates and switches to passive receive mode. The central station may at this time transmit a command data frame. This command data is formatted in the manner previously described in that the word order is reversed. Each console has a receive register 134 which is an 8 bit serial to parallel shift register, with each of the registers in each of the consoles connected in series to form one long register. The data is thus shifted through the master console register first and then through all of the slave console registers, so that the first word in will move to the last slave console.

When either a high tone (logic 1) or low tone (logic 0) is detected from the telephone line 120 by the demodulators 126 or 130, a receive clock is generated from the gate 136.

The receiver clock signal is delayed by the delay circuit 138 for one-half the width of a tone pulse to insure that the detector has stabilized. The clock then becomes a receive clock for the receive registers. At the instant of clocking, the master console receive register 134 shifts the detected data from the tone demodulator into its beginning end and all data is shifted out toward the slave consoles. After 128 such clocks, a command data frame is indexed correctly into registers and is ready to be stored in the command register latches.

At the end of the command frame, the command data is held temporarily in the receive shift registers. The registers cannot be utilized for permanent storage, because they are not stable while new data is being shifted through. Thus, a command register 142, made up of a matching number of memory elements, is provided for storage. At the beginning of the next status data frame, after the command frame, the start pulse strobes the command register 142 and causes it to parallel load the command data from the receiver register 134. This data will then be held steadily until the receipt of a new command frame. The command data will then light indicators or cause responses as noted below.

In the event of a communication failure between the central station and the master console, the central station commands will be inhibited and the consoles will revert to being "stand alone" fire and burglar alarms. This is accomplished by utilizing the 5 second timer 220 to cause the switchover. Normally, the timer 220 is being reset by the start pulses from the central station at less than 5 second interval, so that it never has a chance to time out. While it is thus being reset, the output of the timer enables the output from the command register 142. If a start pulse is not received for the 5 second interval, the timer 220 disables the command outputs and enables local control of the burglar alarms.

When a message is sent from the central station indicating an acknowledgement of an initial panic alarm from a belt unit, a "message received acknowledgement" will be sent back to the console by a command word. This is stored in the command register 142 and operates the one shot multivibrator 148 to light a lamp in the annunciator panel 146 and also to activate the transmitter to transmit via the antenna 160 a radio signal to the belt unit. As noted, the belt unit, upon receipt of this transmission, generates a vibration which may be felt by the wearer.

One set of the sensor inputs to the buffer 168 are a set of perimeter contact or door switches. Whether the contacts are complete or not is reported as a status bit to the central station. An arm memory element 184 is set or cleared by command from a central station. The central station will normally set or clear element 184 in response to codes entered on the touchtone pad 230. The status of this memory element 184 is also reported to the central station. The alarm bell operated by the bell drive 174 is under direct control of the central station via the command register 142. If an intrusion occurs (or the perimeter contact is broken while the arm memory is set) the central station may operate a bell through the bell drive 174, or delay the bell to allow authorized disarming by code entry, or act as a silent alarm, according to the programming at the central station.

In the event of communication failure, control of the arm memory circuit 184 and the alarm bell drive 174 is altered. The arm memory element 184 may then be set or cleared directly from the touchtone pad 230 via the arm sequence logic, which will work with a simple fixed code entry. The alarm bell may then be activated whenever the perimeter is broken while the arm memory is set. Fire warning horn drive 164 may be activated by either the local fire sensors or by the central station command, regardless of whether or not the communication link is good or not.

As previously noted, the operation of each of the slave consoles are similar to that previously described with respect to the master console, except that there is no telephone line interface or clock control logic, these functions being performed by the master console.

As previously noted, important aspects of the invention include the initial operation of a belt unit to generate a panic signal. This panic signal is received at the central station and an acknowledge signal is transmitted from the central station to the console. A radio signal is transmitted to the belt unit and the wearer is alerted by operation of the vibrtor that an alarm has been sent. The central station then allows a predetermined period of time, such as from 10 to 15 seconds, for the operator to wipe out the alarm signal. If the touchtone pad 230 is not correctly operated within this period, the central station sends for assistance and also sends a "help on the way" signal through the console, which then relays a radio signal to the belt unit to operate the vibrator in the predetermined manner to indicate to the wearer that assistance is on the way.

Another aspect of the invention is the running of a second time period at the central station after the police have generated an "on scene" signal through the communication link to the central station. If the police do not get to the touchtone pad 230 within the second period of time and generate the "situation clear" via the pad, the central station automatically transmits a new assistance signal to summon additional assistance.

It will thus be seen that the present invention provides an improved emergency warning device and includes a number of failsafe features to eliminate false or unintentional actuations of an alarm. In addition, the wearer is provided with immediate information as to whether or not an alarm signal has been received. The present system is automatically operable and constructed to eliminate inoperability due to mechanical failure.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. An emergency communication system comprising:
- a portable unit for being carried by a wearer,
- an alarm in said unit and having an alarm switch for being activated by the wearer to transmit alarm radio waves to a remote location,
- a console at said remote location for receiving said alarm radio waves and for transmitting a request for assistance signal to a central office and acknowledge radio waves to said portable unit indicating that assistance has been summoned,
- a first switch on said console which cancels the transmission of the request for assistance signal if said first switch is actuated by the wearer within a predetermined time period after actuation of said alarm,
- means in said portable unit for receiving said acknowledge radio waves and for physically notifying the wearer that said predetermined time period has expired without said first switch being actuated and that assistance has been summoned, and
- a second switch on said console for preventing transmission of additional request for assistance signals if said second switch is actuated within a predetermined interval after assistance has arrived.

2. The emergency communication system of claim 1 and further comprising:
- a vibrator for vibrating against the body of the wearer to indicate that assistance has been summoned.

* * * * *